Jan. 10, 1956    W. D. SMITH    2,729,897
INSTRUMENT FOR TRANSFERRING SURVEY REFERENCE POINTS
Filed Oct. 6, 1952    3 Sheets-Sheet 1
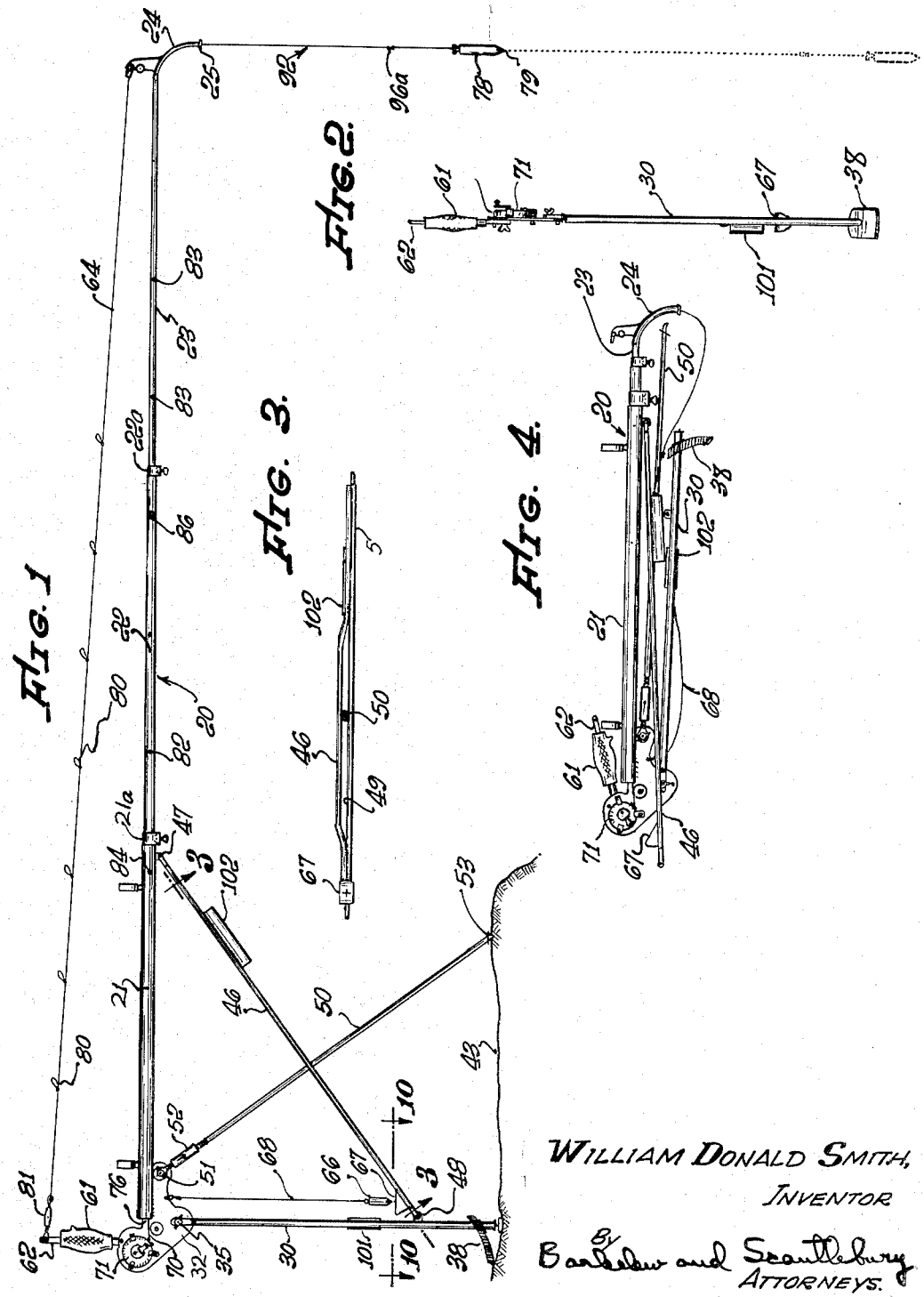
WILLIAM DONALD SMITH,
INVENTOR
Bartelew and Scantlebury
ATTORNEYS.

Jan. 10, 1956   W. D. SMITH   2,729,897
INSTRUMENT FOR TRANSFERRING SURVEY REFERENCE POINTS
Filed Oct. 6, 1952   3 Sheets-Sheet 2
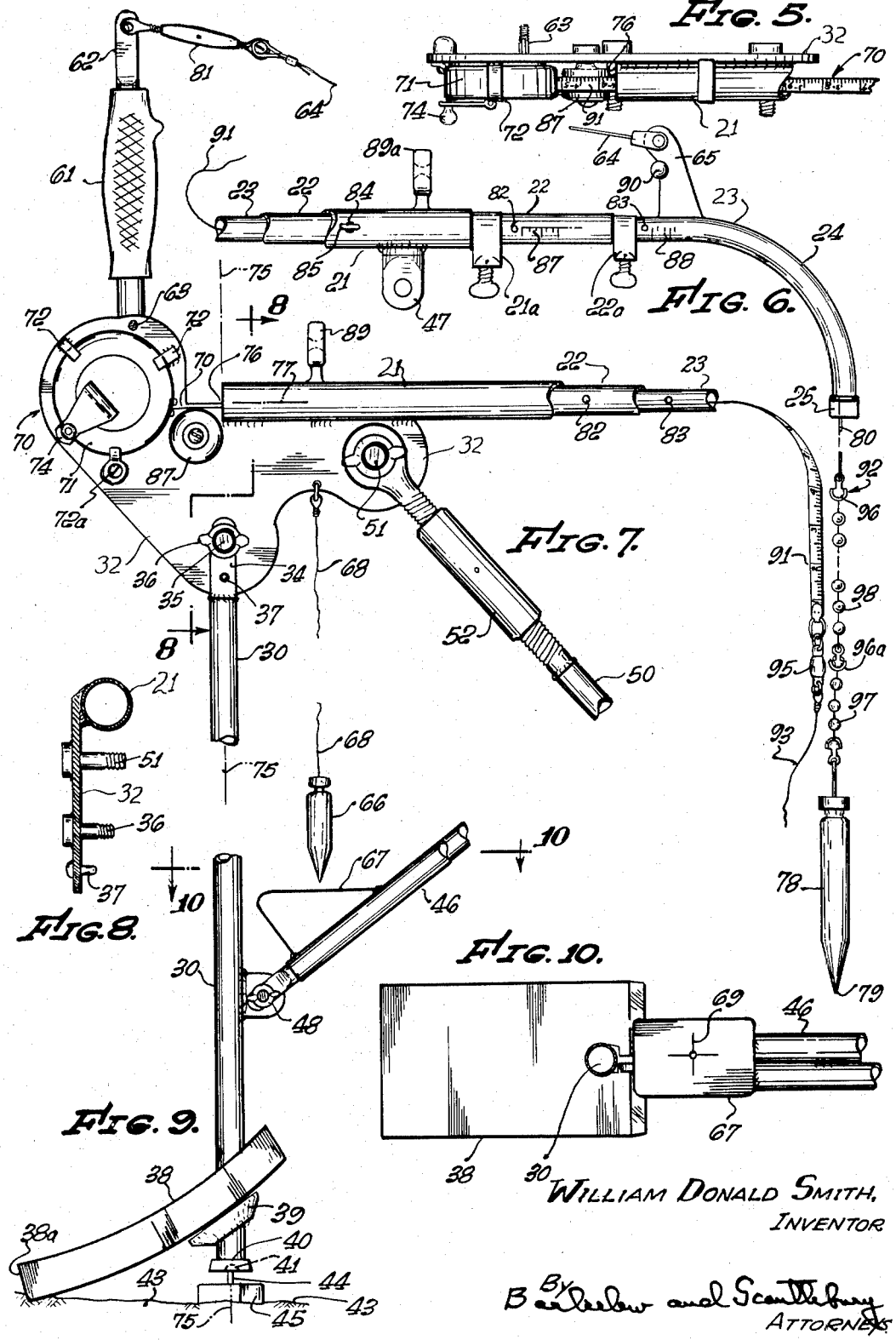
William Donald Smith,
INVENTOR

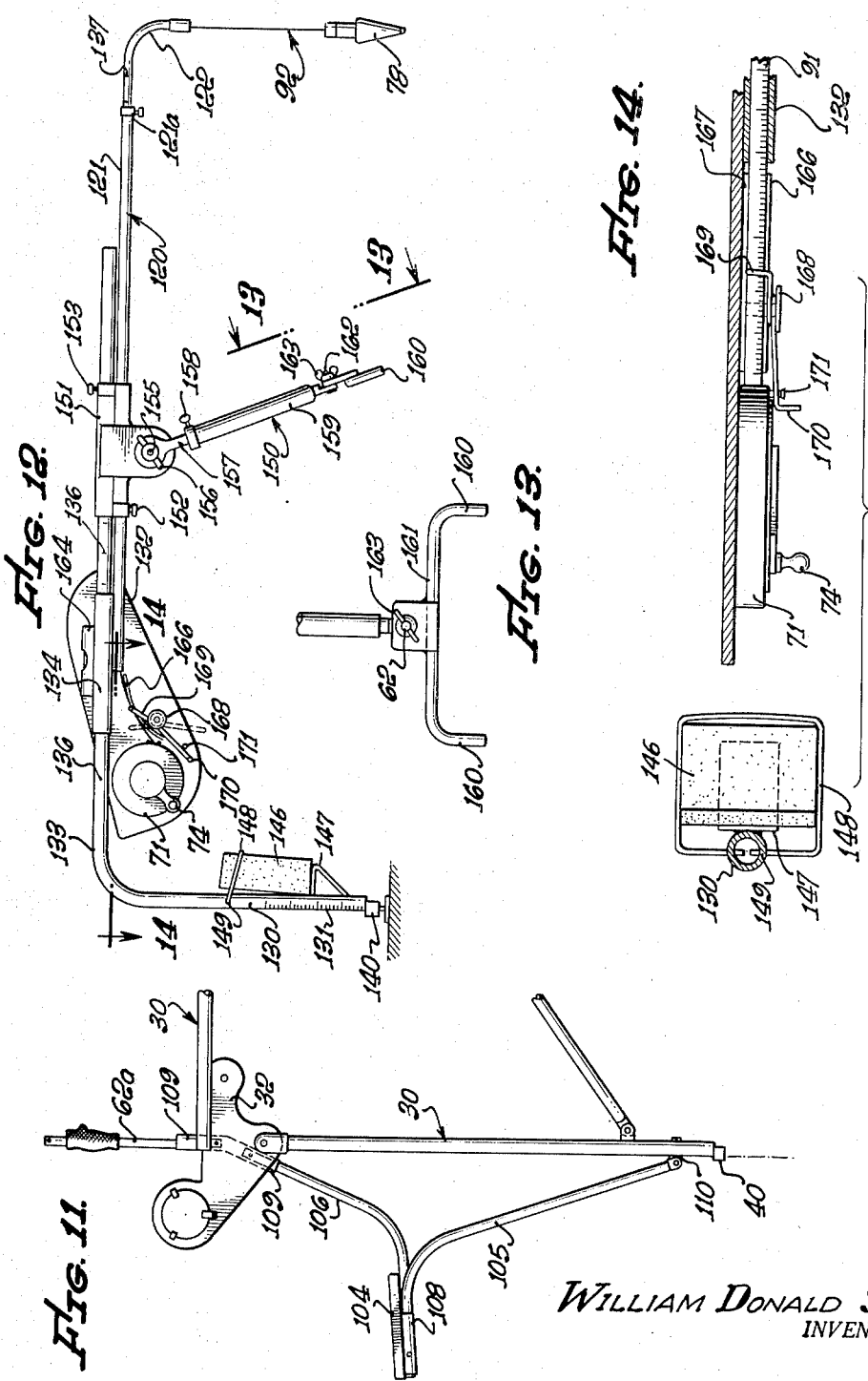

United States Patent Office 2,729,897
Patented Jan. 10, 1956

2,729,897
INSTRUMENT FOR TRANSFERRING SURVEY REFERENCE POINTS

William Donald Smith, Newport Beach, Calif.

Application October 6, 1952, Serial No. 313,209

9 Claims. (Cl. 33—217)

This invention is concerned generally with instruments for transferring survey reference points by simultaneous measurement of horizontal and vertical offsets. The invention is useful in many branches of the construction industry.

In many types of construction work, for example in laying drain pipe in a ditch, constructing canals, footings for dams and buildings, driving piles and the like, the survey establishes reference points that are offset from the line of the actual construction by definite distances, selected to permit convenient marking of the reference points, as by nails set in stakes driven into the ground. In checking the actual construction it is then necessary to transfer accurately and rapidly from the reference points back to the construction points that they represent. That typically involves measuring a horizontal and a vertical distance from each reference mark and determining the relation of the construction work to the point that is so determined.

The usual practice in establishing the original reference points by survey is to maintain the same horizontal offset throughout a series of stations, although various horizontal offsets may be employed for different jobs or for different groups of stations on one job. The horizontal offsets are usually measured in even feet. The vertical offsets, on the other hand, are typically different for each point, and may be measured in feet and hundredths of a foot.

A primary object of the present invention is to provide an instrument by which such vertical and horizontal offsets may be measured simultaneously from a reference mark. The invention further permits one man to set up the instrument rapidly at successive stations and to transfer the reference marks by the required vertical and horizontal distances. The instrument is readily settable for the required horizontal offset, and may then be set up and adjusted at the reference mark in a manner to be described. The instrument then automatically provides the correct horizontal offset, and the vertical offset is measured directly by reference to a calibrated scale.

An important advantage of the instrument is the ease with which it can be set up and adjusted at each station, even on uneven ground. In preferred form, the instrument is light enough to be easily carried from one station to another, and is readily foldable for transportation between jobs.

An instrument in accordance with the invention typically comprises a boom, which is preferably adjustable in length, and may be constructed, for example, of telescoping sections of tubing; supporting means for the boom, by which it can be held in horizontal position at a definite distance above the reference mark and with a definite point of the boom directly over that mark; and a flexible measuring element, which may typically compirse a calibrated measuring tape. The tape, or other suitable element, extends along the length of the boom and hangs freely as a vertical line from its outer end, which overhangs the supporting means. Control means are provided near the head end of the boom for variably controlling the length of the line hanging from the boom end. Moreover, indicating means are preferably provided, also near the head end of the boom, for indicating directly the vertical distance that the measuring element extends below the level of the reference mark.

The invention will be fully understood, together with its further objects and advantages, from the following description of certain illustrative embodiments, of which description the accompanying drawings form a part. Many changes may be made in the particular structures described, and various particular structures are in many instances best fitted for different types of work. The illustrative embodiments described by the present specification and drawings are each representative of a variety of detailed structures. The scope of the invention is not intended to be limited by the particular embodiments described, but is defined by the appended claims.

In the drawings:

Fig. 1 is a side elevation, showing an illustrative instrument in accordance with the invention, with boom fully extended;

Fig. 2 is a rear elevation corresponding to Fig. 1;

Fig. 3 is a fragmentary section on line 3—3 of Fig. 1;

Fig. 4 is a plan, showing the instrument in folded condition for carrying;

Figs. 5–10 are fragmentary views at enlarged scale, of which

Fig. 5 is a fragmentary plan with mast removed;

Fig. 6 is a fragmentary side elevation of the outer portion of the boom in withdrawn position;

Fig. 7 is a fragmentary side elevation of the head portion of the instrument;

Fig. 8 is a vertical section on line 8—8 of Fig. 7 with primary and secondary legs removed;

Fig. 9 is a fragmentary side elevation of the lower portion of the primary leg;

Fig. 10 is a fragmentary section on line 10—10 of Fig. 9;

Fig. 11 is a fragmentary side elevation showing a modification;

Fig. 12 is a side elevation, showing another illustrative embodiment of the invention;

Fig. 13 is a fragmentary section on line 12—12 of Fig. 11; and

Fig. 14 is a fragmentary vertical section at enlarged scale on line 14—14 of Fig. 12.

In the particular form illustrated in Figs. 1 to 10, the horizontal boom is indicated generally by the numeral 20, and comprises three telescoping sections of tubing 21, 22 and 23. Friction clamps, indicated at 21a and 22a, are preferably provided to clamp the telescoping movement of the tubes at any desired position. The outer end of outer section 23 is curved downward at 24 and preferably carries an annular guard, indicated at 25, of relatively soft material such as plastic or rubber. At the inner end of inner section 21 is mounted a frame member, shown typically as a flat plate 32, which will be referred to generally as the head plate of the instrument.

A primary supporting structure, shown illustratively as a single leg 30 extends from head 32 transversely of the boom. In operating position leg 30 is rigidly mounted at a definite angle to the boom, typically 90°, and is preferably foldable for convenience of transportation, as typically shown in Fig. 4. In the form illustrated, leg 30 is of tubular construction, and its upper end is welded to a flat bracket plate 34 which is pivotally mounted on head plate 32 by means of pivot stud 35 and clamping means such as the wing nut 36. A pin 37, set in head plate 32 and received by a hole in bracket 34, positively locks leg 30 at the correct angle.

The lower end of leg 30 carries a reference member 40 of any suitable type, adapted to be located accurately with respect to the survey reference mark from which offset measurements are to be made. When, as is ordinarily the case, that reference mark comprises a nail 44 set in a wooden stake 45 driven into the ground 46, the reference member may be a lug having in its bottom face a cavity 41 of suitable size to receive the nail head. With the nail head seated in that cavity, the instrument may be supported directly on the reference mark. The foot of leg 30 is then accurately and positively located with respect to the reference mark. To facilitate holding it in that position, a foot rest is preferably provided, as indicated at 38. Foot rest 38 is shown as an elongated sheet of somewhat flexible material, such as thick rubber, one end of which is apertured to receive leg 30. An oblique flange 39 defines the longitudinal position of the foot rest on the leg. Its free end may be pressed down into contact with the ground 43, as indicated at 38a, by pressure of a foot or a knee of the operator. The operator's weight then provides relatively great frictional resistance against lateral displacement of the instrument, while only a portion of that weight, transmitted through the resilience of the foot rest, is taken directly by the instrument.

Particularly if boom 20 is relatively long, a diagonal brace is preferably provided, as indicated at 46. That brace is shown pivoted at one end at 47 near the outer end of inner section 21 of boom 20. The other end of brace 46 is releasably bolted at 48 to a lug rigidly mounted near the foot of leg 30. As shown, brace 46 comprises two parallel members that are spaced apart for a major part of their length to form a longitudinal slot 49.

A secondary leg 50 of variable effective length is provided for leveling the boom and for maintaining the instrument in leveled position. As illustrated, secondary leg 50 is pivotally connected at 51 to head plate 32 for swinging movement in an axial plane of boom 20. Leg 50 is received and guided by slot 49 in brace 46, and its swinging movement about pivot 51 is thereby guidingly confined to the plane of the instrument, which is the plane of the paper in Fig. 1, for example. Any suitable means may be employed for adjustably varying the length of secondary leg 50, the turnbuckle structure 52 at the upper end of the leg being illustrative of such means. At the lower end of leg 50 any suitable foot structure may be provided. That shown in the present embodiment comprises a single foot formed by a flange 53 surrounding the leg near its lower end.

A handle 61 may be provided for convenience in manipulating the instrument. As illustrated, handle 61 forms a part of a mast 62 which is preferably foldably mounted on head plate 32, as by the pivot stud 63. In operating position, mast 62 projects rigidly upward from boom 20 and supports the inner end of a guy wire 64, connected via a turnbuckle 81. The other end of guy wire 64 is secured to the outer end of boom 20, as by the bracket 65 fixed on boom section 23. The length of guy wire 64 is roughly adjustable over a wide range, as by any suitable type of readily adjustable clamping means, to accommodate variations in boom length, to be described. Accurate final adjustment of the guy wire length may be made by turnbuckle 81. That adjustment permits accurate alinement of the outer portion of the boom with inner boom section 21. Such alinement may be checked by sighting along the boom itself. Alternatively, sights of any desired type may be provided. As illustrated, a peep sight 89 is mounted at the inner end, and a ring sight 89a at the outer end, of boom section 21; and a sighting bead 90 is provided as a part of guy wire bracket 65 at the outer end of the boom. Alinement of those three sighting elements insures that the entire boom forms the correct angle with leg 30, and hence with the level indicating means to be described.

By suitably setting the angle of leg 50 in accordance with irregularities of the ground, and adjusting its length by manipulation of turnbuckle 52, boom 20 may be made accurately horizontal. That condition may be indicated by level-indicating means of any suitable type. A plumb bob 66 is shown illustratively, suspended by line 68 from head plate 32 and hanging just above the horizontal surface of a bracket 67 mounted, for example, near the lower end of brace 46. Reference marks 69 are provided on that bracket surface in position to indicate both whether the plane of the instrument is vertical and whether boom 20 is horizontal.

In adjusted position of the instrument a vertical line 75 through the reference mark 44 intersects the axis 77 of boom 20 at a definite point 76. That intersection of the reference vertical and the boom axis will be referred to for convenience as the horizontal zero of the instrument. In the present instance the reference vertical 75 is coaxial with leg 30 and passes through the inner end of boom 20. That boom end therefore provides a convenient indication of the position of horizontal zero 76.

A flexible measuring element 70 of any suitable type and calibrated in any suitable manner may be used for measuring vertical offsets in cooperation with the main structure already described. Means are provided at the head of the instrument for controlling the movement of that measuring element. In the preferred form of the invention, a socket is provided in the face of head plate 32 of suitable shape to receive the case 71 of a standard measuring tape reel. That socket may comprise a plurality of ears 72, at least one of which, indicated at 72a, is shiftable as by rotation to permit reel case 71 to be placed and removed. The tape may be conveniently manipulated with one hand by means of the reel crank 74. Means are provided for leading the tape, or other measuring element, along the length of boom 20 and for permitting its end portion to hang freely from the outer end of the boom at a definitely determined horizontal distance from reference vertical 75. In the present embodiment, a guideway for the tape is provided within the telescoping tubes of the boom, and the curved outer end 24 of the boom functions as a sheave for the tape. The tape, or other element, then hangs as a vertical line indicated at 92. A suitable indicating element, shown as the plumb bob 78, is provided at the free end of line 92, with indicating point 79.

A guide for the tape between reel case 71 and the inner end of boom section 21 is shown illustratively as the roller 87, providing a smooth surface immediately below the tape, and against which the tape may conveniently be pressed by the thumb to limit its outward movement under the weight of plumb bob 78. A mechanical brake for the tape may be further provided, as will be described. The inner end face of boom 20 at horizontal zero 76 may be utilized as an index mark against which to read the tape calibrations.

Means are preferably provided for positively locking the relative telescoping movement of boom sections 21, 22 and 23 in definite predetermined relationship. Such positive locking means preferably supplements, but may replace the frictional clamps 21a and 22a. As illustratively shown, that locking means comprises a series of uniformly spaced transverse bores 82 and 83 in the boom sections 22 and 23, respectively, and a single bore 84 in inner boom section 21. After alining bore 84 with any selected bores 82 and 83, a locking pin 85 may be inserted in the alined bores, preventing relative translation and also rotation of the several boom sections. The boom length is thereby positively determined. If outer boom section 23 is withdrawn completely from inner boom section 21, so that pin 85 does not engage it, an additional locking pin 86 may be inserted through any two alined bores 82 and 83 of sections 22 and 23 (Fig. 1).

The uniform interval between adjacent bores 82 and 83 in boom sections 22 and 23, respectively, is selected in accordance with the work for which the instrument is intended. Since horizontal offsets are ordinarily measured in even feet, that interval is typically selected as one foot, although any other interval may be employed. Bore 84 in boom section 21 is then so placed that with locking pin 85 (and pin 86, if needed) in locking position the horizontal distance from reference vertical 75 to the freely hanging plumb line 92 is an integral number of feet. A convenient manner of varying the length of guy wire 64 to correspond to the definite increments of boom length is represented by wire loops 80, distributed at suitable locations along the guy wire for selective connection to the outer end of turnbuckle 81. Approximate adjustment of the guy wire to correspond to any even setting of the boom length may then be made by selection of the appropriate loop. Final alinement of the boom end with inner boom section 21 is made if required by means of turnbuckle 81, as already described.

Scale indications 87 and 88 (Fig. 6) are preferably provided on boom sections 22 and 23, respectively, for indicating the effective length of the boom under any given condition of adjustment. In each instance the outer end of the next larger section may be employed as an index in reading the scale. The scale on outer boom section 23, for example, may read zero when that section is in its least extended position, as indicated at 88, and read the degree of relative extension for other positions; and the scale on boom 22 may read, for each position of its movement, the total effective boom length that obtains when outer section 23 is in its withdrawn, or zero, position. Such indication is typically shown at 87 as 6 feet. The actual effective boom length is then immediately determinable for any setting condition by adding together readings of the two scales 87 and 88. Whereas for many types of work it is sufficient to provide scale indications such as 87 and 88 that correspond only to the particular settings obtainable by positive locking means 82—86, complete scales may be provided, if desired, calibrated, for example, in feet and hundredths of a foot. Such scales may be employed in connection with clamping means 21a and 22a, for example, to provide horizontal offsets of intermediate value.

The entire instrument is preferably constructed to fold compactly for carrying, as indicated in Fig. 4. As there shown, boom 20 has been fully withdrawn. Brace 46 has been disconnected at its lower end and swung upward parallel with the boom. Legs 30 and 50 and mast 62 have been swung forwardly into folded positions. Plumb bobs 66 and 78 are housed for carrying in cases attached to the main structure in any suitable manner, and indicated at 101 and 102. The entire measuring element 70 has been reeled back into reel case 71. Alternatively, reel case 71 may be removed from its socket when the instrument is not in use, making the tape available for other work.

An important aspect of the invention is provision for varying the means for measuring the vertical offset to compensate for the condition of adjustment of the instrument with respect to the horizontal offset. By providing such compensation, it is possible to read the vertical offset directly at the instrument head regardless of the particular value of the horizontal offset for which the instrument is set. In the preferred form of the invention, that compensation is provided in a remarkably simple and economical manner. Measuring element 70 comprises an inner portion, typically consisting of a calibrated steel tape 91, and an outer portion 92 typically including a leader 93 of definite predetermined length, to which additional sections of definite length can be selectively added. Outer portion 92 also includes the indicating element, represented by plumb bob 78. Leader 93 is preferably of steel wire and is connected at its inner end to the zero end of tape 91 by means of a swivel fitting, indicated at 95 in Fig. 7. The outer end of leader 93 carries a fitting 96 to which bead chain is releasably attachable (Fig. 6). Plumb bob 78 is provided with a short length of bead chain 97, by which it may be attached directly to fitting 96. Additional sections of bead chain are provided, one of which is indicated illustratively at 98. Each section 98 carries a fitting 96a at one end and is adapted to be connected at its other end either directly to leader fitting 96 or to the corresponding fitting 96a of another section. Thus any desired section or sections 98 may conveniently be inserted in outer portion 92 of the measuring element between leader fitting 96 and plumb bob line 97, or all additional sections may be removed and the plumb bob line connected directly to leader fitting 96.

In preferred form, the length of the leader without additional sections is such as to support plumb bob 78 with its point 79 at the reference level of reference member 40 when the instrument is set up as described with the boom in its shortest position of adjustment and with the zero end of calibrated tape 91 at horizontal zero 76. Additional sections 98 may be provided in an assortment of lengths that can be combined to give lengths corresponding to the available definite increments by which boom 20 may be adjustably extended. For example, three sections such as 98 may be provided having respective lengths of one, two and four feet. The length of the measuring element may then conveniently be extended by any selected integral number of feet from one to seven, inclusive. With the measuring element extended to correspond to the degree of boom extension, the reading of calibrated tape 91 at horizontal zero 76 (Fig. 5) indicates directly the vertical distance of plumb bob point 79 below the level of reference member 40. The vertical range of the instrument is limited only by the capacity of the vertical metering device, in the present instance by the length of tape 91, which can be provided in any practical length.

To operate the instrument, the operator sets and locks boom sections 21, 22 and 23 at the degree of relative extension corresponding to the required horizontal offset. If the boom is much extended, he attaches guy wire 64 at the required loop 80, and by means of turnbuckle 81 brings the entire boom into accurate alinement. To leader 93 the operator attaches one foot of leader extension for each foot of boom extension beyond minimum boom length. The instrument is then ready to operate. The operator places reference member 40 on the station reference mark to be transferred, grasps the handle 61 and places one foot on foot rest 37. With the boom extending transversely of the survey line, he adjusts secondary leg 50 by means of turnbuckle 52 until plumb bob 66 indicates horizontal position of the boom. He then allows plumb bob 78 to draw out tape 91 until he reads at horizontal zero 76 the desired vertical offset. The point of plumb bob 78 then indicates the transferred reference point, both as to its horizontal and its vertical position. Successive operations are relatively rapid, particularly in such work as sewer line construction in which reference points are ordinarily all set at the same horizontal offset distance and only the vertical offsets change from station to station. Thus a single setting of boom length may suffice for an entire construction job which may call for hundreds of individual transfers.

Fig. 11 illustrates a modification that includes a straddle seat 104 for the operator. As shown, two tubing struts 105 and 106 extend from the seat to the lower end of primary leg 30 and to head plate 32, respectively. The struts are received in tubular brackets 108 fixed to the under side of the seat, at least one tube being rotatable in its bracket to facilitate folding. Strut 106 is releasably connected to head plate 32 by a tubular bracket 109, the other end of which may receive the mast 62a. The lower end of strut 105 is shown bolted to a bracket 110 on leg 30.

Seat 104 is centered in the plane of the instrument (the plane of the paper in Fig. 11) and is on the side of leg 30 opposite to boom 20. The seat is so spaced from leg 30 that the weight of the operator's body on the seat balances only a portion of the weight of boom 20 with respect to reference member 40 as a fulcrum. By placing his feet on opposite sides of the instrument plane, the operator is enabled to hold the instrument firmly in balance, with just sufficient weight on secondary leg 50 to facilitate leveling of the boom as already described.

Figs. 12 to 14 show another illustrative embodiment of the invention, which is particularly well adapted for work in which the horizontal offset is relatively short. The instrument is supported closer to the ground than is the previously described embodiment, and may be operated conveniently in a kneeling position. It will be understood that many features illustrated in only one of the embodiments herein described may be employed alternatively in another, as well as in instruments of quite varied construction adapted for performing the same basic functions.

In the present embodiment, the main boom is indicated by the numeral 120 and comprises an inner section 121, which is rigidly connected to head plate 132, and an outer section 122 telescopically related to the inner section and provided with locking means 121a. The primary support of the instrument is a single leg formed by the downwardly bent portion 130 of the generally horizontal tube 133. The horizontal portion of tube 133 is slidingly received in the tubular bracket 134, which is fixed to head plate 132 and hence rigidly related to inner boom section 121.

A reference member 140 is mounted at the lower end of leg 130, and may be of the general type already described. However, member 140 as shown is offset from the axis of the leg in a manner to place the reference mark in alinement with the rearward surface of the leg. A scale is preferably provided on that surface, as indicated schematically at 131. Scale 131 is so constructed as to read distances, for example in feet and hundredths of a foot, above the reference level of reference member 140. Such a scale is useful, for example, for making offsets from a reference mark that comprises a string stretched above the ground. The instrument may be set up for that purpose with leg 130 on the ground at any convenient level and with the reference string immediately adjacent an arbitrary point of scale 131. The scale reading at the string then represents the distance to be subtracted from the record vertical offset to compensate for the fact that reference member 140 is located below, rather than at the string.

The means for leveling the instrument of Figs. 12 to 14 comprises a secondary leg 150, which is mounted for both pivotal and sliding movement with respect to boom 120. The illustrative structure shown includes the slide 151, working on the dual ways provided by boom section 121 and the forward portion of tube 133. Clamping means for the slide with respect to those ways are indicated at 152 and 153, respectively. The leg proper is pivoted on slide 151 by means of the pivot stud 155 and clamping nut 156 for swinging movement in an axial plane of boom 120.

The lower end of leg 150 is provided with any suitable foot structure. As shown, a pair of feet 160 are carried in spaced apart relation on the cross bar 161, which is centrally pivoted at 162 at the lower end of the leg proper. Pivotal movement of cross bar 161 may be frictionally clamped, as by a wing nut 163. The actual length of leg 150 is preferably variable in any suitable manner. As shown, the main body of the leg comprises a tube 159 which carries pivot 162 and into which upper leg portion 157 is telescopically received, with clamping means indicated at 158. Alternatively, a turnbuckle type of structure, for example, may be utilized, as described in the previous embodiment. The effective length of the leg, as illustrated, may also be varied adjustably by shifting the longitudinal position of slide 151 on its ways. With feet 160 planted on a line transverse of the boom length, such movement of slide 151 causes the entire leg 150 to swing about feet 160, varying the height of pivot 155, and therefore having much the same effect upon boom 120 as if the actual length of leg 150 had been varied. Hence the instrument may be leveled by adjusting either the actual or the effective length of the secondary leg.

A level glass for indicating horizontal position of boom 120 is indicated at 164.

In setting up the instrument, it may be convenient to loosen nut 163 at the base of leg 150, thereby permitting the entire instrument to pivot about an axis through pivot 162 and reference member 140. When the plane of the instrument is substantially vertical, as may be determined sufficiently accurately for practical purposes by eye, clamp nut 163 may be tightened. Leveling of boom 120 in the vertical plane of the instrument may then be carried out approximately by means of the sliding extension of leg 150, and finally set accurately by means of the horizontal sliding movement of slide 151.

In some positions of adjustment the instrument as already described will stand by itself, even on very rough ground, freeing both hands of the operator. To make the instrument more stable, a suitable weight may be mounted on the instrument frame. A particularly convenient type of weight for such use is a common brick, and means are preferably provided for mounting a brick near the bottom of the primary leg, as indicated in Figs. 12 and 14. A brick 146 is shown resting on end on a shelf bracket 147, welded directly to the tubing of the leg. A confining loop of wire 148 is pivotally mounted in a transverse bore 149 in the leg, and is of such size as to freely embrace the brick and hold it in upright position.

In the present embodiment tube 133 may be considered as a supporting portion of leg 130, as above described. Alternatively, the horizontal portion of tube 133 may be considered as the inner section of boom 120, corresponding to boom section 21 of the previous embodiment. From that viewpoint, head plate 132 of the present instrument may be considered to be mounted on the second section of the boom, rather than on the inner section, as in the previous embodiment. That structural arrangement is particularly convenient in permitting greater variation in the distance between the primary and secondary legs, as may be convenient on rough ground, while maintaining the instrument head conveniently adjacent the secondary leg adjustments.

Scale indications and positive locking means are preferably provided in the present embodiment for convenience in setting the boom to the required length. For example, a scale on boom section 122, as indicated schematically at 137, may be read at the outer end of boom section 121 as an index; and scale 136 on tube 133 may be read at one end of bracket 134. Those scales may be so calibrated, as already described for scales 87 and 88 of the previously described embodiment, that the sum of their readings represents the total effective boom length.

The measuring element of the present embodiment may be substantially the same as that already described, and corresponding numerals have been employed where applicable. The previous description will not be repeated in detail.

The embodiment of Figs. 12 to 14 includes braking means for applying a frictional braking force to the measuring tape between tape reel case 71 and the index at which the tape calibrations are read. In the form illustrated, a curved tape guide is shown at 166, rigidly mounted on head plate 132 closely adjacent the lower face of the tape and providing a smooth upper surface against which the tape may be checked by thumb pressure. That surface may also carry an engraved index mark 167 against which to read the tape calibrations in measuring the vertical offset. A stud 168 is fixed in head plate 120 just below guide 166 and carries a loosely coiled spring, the opposite arms of which are indicated at 169 and 170. One arm 169 extends above the tape guide and tape, and is bent inwardly toward head plate 120 in a manner to press the tape against the upper face of the guide when the spring is rotated on its stud clockwise as seen in Fig. 12. Such rotation can be resiliently urged by swinging the other arm 170 to the left as shown in that figure and hooking it over the pin 171, fixed in head plate 120. Braking position of the spring is indicated in solid lines, and tape releasing position in dashed lines. The frictional force of the set brake is preferably sufficient to hold the tape against the weight of plumb bob 78, but permits the tape to run out if subjected to abnormal tension.

I claim:

1. An instrument of the class described, comprising a boom, supporting means for one end of the boom extending transversely from the boom in rigid relation thereto and carrying at a predetermined distance from the boom axis a reference member adapted to be accurately positioned with relation to a fixed reference mark, means for leveling the boom, a measuring element dependent from the other end of the boom under directional control of gravity and carrying a position indicator at its free end, and control means adjacent the said one end of the boom for controllably varying the length of the pendent portion of the measuring element, said means for leveling the boom including a secondary support of adjustably variable effective length and means indicating angular departure of the boom from horizontal position, the secondary support comprising a leg having a foot at one end and pivotally connected at the other end to the boom, and means for adjustably shifting the point of said connection longitudinally of the boom.

2. An instrument of the class described, comprising a boom, supporting means for one end of the boom extending transversely from the boom in rigid relation thereto and carrying at a predetermined distance from the boom axis a reference member adapted to be accurately positioned with relation to a fixed reference mark, means for leveling the boom, a measuring element dependent from the other end of the boom under directional control of gravity and carrying a position indicator at its free end, and control means adjacent the said one end of the boom for controllably varying the length of the pendent portion of the measuring element, said means for leveling the boom including a secondary support of adjustably variable effective length and means indicating angular departure of the boom from horizontal position, the secondary support comprising a slide mounted on the boom for longitudinal movement with respect thereto, means for locking the slide against its said movement, and a leg pivotally connected to the slide for swinging movement in a plane parallel to the length of the boom.

3. An instrument of the class described, comprising a boom, supporting means for one end of the boom extending transversely from the boom and carrying a reference member adapted to be accurately positioned with respect to a fixed reference mark, means for leveling the boom, means for adjustably varying the effective length of the boom, a flexible measuring element extending longitudinally of the boom from adjacent its said one end and depending from its other end under directional control of gravity, and control means adjacent the said one end of the boom for controllably varying the length of the pendent portion of the measuring element, the boom comprising a plurality of telescopically related tubing sections and means for positively locking the said sections selectively in any one of a plurality of definitely predetermined conditions of mutual extension, and a flexible member and means for releasably connecting that member to the said measuring element to extend its effective length by a predetermined distance, that distance being equal to the difference between the effective lengths of the boom in two of its said conditions of extension.

4. An instrument of the class described, comprising a boom, supporting means for one end of the boom extending transversely from the boom and carrying a reference member adapted to be accurately positioned with respect to a fixed reference mark, means for leveling the boom, means for adjustably varying the effective length of the boom, a flexible measuring element extending longitudinally of the boom from adjacent its said one end and depending from its other end under directional control of gravity, and control means adjacent the said one end of the boom for controllably varying the length of the pendent portion of the measuring element, the boom comprising a plurality of telescopically related tubing sections and means for positively locking the said sections selectively in any one of a plurality of definitely predetermined conditions of mutual extension, and tensionable means for adjustably supporting the outer end of the boom, and cooperating sighting means mounted on the inner and the outer portions of the boom and adapted to indicate their condition of mutual alinement.

5. An instrument for transferring survey reference points, and comprising an elongated boom having a boom axis, means indicating level condition of the boom, an index mark adjacent one end of the boom, a flexible measuring element extending past the reference mark and depending under directional control of gravity from the other end of the boom, control means adjacent the said one end of the boom for longitudinally shifting the measuring element, a fixed reference leg rigidly mounted on the boom and extending transversely therefrom, a defining formation on the outer portion of the leg adapted to rest on a fixed reference point and to support the boom with relation thereto with the reference point spaced at a definite predetermined distance from the boom axis and lying in a plane that perpendicularly intersects the boom axis at the said index mark, a second leg mounted on the boom and spaced longitudinally thereof from the reference leg, and means for adjustably varying the effective length of the second leg to level the boom.

6. An instrument for transferring survey reference points, and comprising an elongated boom having a boom axis, means indicating level condition of the boom, a reference leg rigidly mounted at one end of the boom and extending transversely therefrom, a defining formation on the outer portion of the leg adapted to support the instrument with respect to a fixed reference point with the reference point spaced at a predetermined distance from the boom axis and opposite a definite point of that axis, a second leg spaced longitudinally of the boom from the reference leg, an elongated foot member having supporting foot structures at its ends and pivoted intermediate its length on the free end of the second leg for swinging movement about a pivot axis transverse of the leg and of the foot member, means for releasably locking the said pivotal movement of the foot member, means for adjustably varying the effective length of the second leg to level the boom, a measuring element depending under directional control of gravity from the other end of the boom, and means for controllably varying the pendent length of the measuring element.

7. An instrument for transferring survey reference points, and comprising an elongated boom having a boom axis, means indicating level condition of the boom, a reference leg rigidly mounted at one end of the boom and extending transversely therefrom, a defining formation on the outer portion of the leg adapted to support the instrument with respect to a fixed reference point with the reference point spaced at a predetermined distance from the boom axis and opposite a definite point of that axis, a second leg spaced longitudinally of the boom from the reference leg, an elongated foot member having supporting foot structures at its ends, means mounting the foot member at a point intermediate its length on the free end of the second leg for swinging movement about the longitudinal axis of the leg and for pivotal movement about a pivot axis normal to the said leg axis and to the length of the foot member, means for releasably locking the said pivotal movement of the foot member, means for adjustably varying the effective length of the second leg to level the boom, a measuring element depending under directional control of gravity from the other end of the boom, and means for controllably varying the pendent length of the measuring element.

8. An instrument for transferring survey reference points, and comprising an elongated boom that includes a relatively sturdy main portion and a relatively light outer portion longitudinally shiftable with respect to the main portion, a reference leg rigidly mounted at one end of the main portion of the boom and extending transversely therefrom, a defining formation on the outer portion of the leg adapted to support the boom with respect to a fixed reference point with the reference point spaced at a predetermined distance from the boom axis and opposite a definite point of that axis, means for leveling the boom, a flexible measuring element depending from the outer portion of the boom, means on the main portion of the boom for varying the pendent length of the measuring element, tensionable means for adjustably supporting the outer portion of the boom with respect to the main portion thereof, and cooperating sighting formations mounted at spaced points of the main portion and the outer portion, respectively, of the boom and adapted to indicate the condition of mutual alinement of the boom portions.

9. An instrument for transferring survey reference points, and comprising an elongated boom that includes a main portion and an outer portion longitudinally shiftable with respect to the main portion between a plurality of definitely predetermined conditions of mutual extension, means for supporting the boom in horizontal position, an index mark on the main portion of the boom, a flexible measuring element extending past the reference mark and depending under directional control of gravity from the outer portion of the boom, means on the main portion of the boom for longitudinally shifting the measuring element, means for supporting the boom in horizontal position with its main portion in definite predetermined relation to a reference point, and an elongated compensating member and means for releasably connecting the compensating member to the said measuring element to extend its effective length by a predetermined distance, that distance being equal to the difference between the effective lengths of the boom in two of its said conditions of extension.

References Cited in the file of this patent

UNITED STATES PATENTS

| | | |
|---|---|---|
| 463,586 | Thomas | Nov. 17, 1891 |
| 559,066 | Shickluna | Apr. 28, 1896 |
| 918,869 | Larsen | Apr. 20, 1909 |
| 1,013,400 | Kerr | Jan. 2, 1912 |
| 1,238,570 | Rodecker | Aug. 28, 1917 |
| 1,280,994 | Hand | Oct. 8, 1918 |
| 1,873,433 | Larsen | Aug. 23, 1932 |
| 1,982,304 | Holden | Nov. 27, 1934 |
| 2,016,483 | Carlson | Oct. 8, 1935 |
| 2,055,281 | Dulczewski | Sept. 22, 1936 |
| 2,211,278 | Le Febvre | Aug. 13, 1940 |
| 2,376,407 | Wells | May 22, 1945 |
| 2,472,804 | Bird | June 14, 1949 |
| 2,571,858 | Garland | Oct. 16, 1951 |

FOREIGN PATENTS

| | | |
|---|---|---|
| 69,952 | Germany | July 27, 1893 |
| 9,248 | Great Britain | May 4, 1901 |
| 145,639 | Germany | Oct. 30, 1903 |
| 179,531 | Germany | Dec. 13, 1906 |
| 342,752 | Germany | Oct. 22, 1921 |
| 479,783 | Great Britain | Feb. 11, 1938 |